United States Patent [19]

Nagasaka et al.

[11] 4,396,696
[45] Aug. 2, 1983

[54] ELECTROPHOTOGRAPHIC PLATE HAVING AZO COMPOUND PHOTOSENSITIVE LAYER

[75] Inventors: Hideki Nagasaka, Yamato; Tetsuo Murayama, Machida, both of Japan

[73] Assignee: Mitsubishi Chemical Industries Limited, Tokyo, Japan

[21] Appl. No.: 363,883

[22] Filed: Mar. 31, 1982

[30] Foreign Application Priority Data

Apr. 21, 1981 [JP] Japan ................................. 56-60223

[51] Int. Cl.³ .............................................. G03G 5/06
[52] U.S. Cl. ....................................... 430/78; 430/77
[58] Field of Search ................................... 430/76, 78

[56] References Cited
U.S. PATENT DOCUMENTS 3,898,084  8/1975  Champ et al. ..................... 430/31
4,251,613  2/1981  Sasaki et al. ........................ 430/72

*Primary Examiner*—John D. Welsh
*Attorney, Agent, or Firm*—Oblon, Fisher, Spivak, McClelland & Maier

[57] ABSTRACT

An electrophotographic plate comprising an electroconductive substrate and a photosensitive layer coated thereon, wherein said photosensitive layer comprises an azo compound represented by the general formula (I)

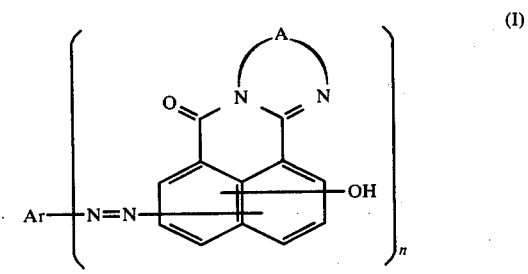

wherein A is a divalent group of an aromatic hydrocarbon or a divalent group of a heterocyclic ring containing at least one nitrogen atom in the ring, Ar is an aromatic hydrocarbon group or a heterocyclic group which may be bonded through a connecting group, and n is an integer of 1, 2 or 3.

10 Claims, No Drawings

ELECTROPHOTOGRAPHIC PLATE HAVING AZO COMPOUND PHOTOSENSITIVE LAYER

BACKGROUND OF THE INVENTION

1. Field of the Invention:

The present invention relates to an electrophotographic plate. More particularly, it relates to a highly sensitive electrophotographic plate having a photosensitive layer comprising an organic photoconductive material.

2. Description of the Prior Art:

Heretofore, inorganic photoconductive materials such as selenium, cadmium sulfide, and zinc oxide have been widely used in the photosensitive layer of the electrophotographic plates. Studies on use of organic photoconductive materials represented by polyvinylcarbazole for the photosensitive layer of the electrophotographic plates have been advanced, and some of such studies have materialized into practical use. The organic photoconductive materials have many advantages over the inorganic materials, for example they are light in weight, and easy to fabricate as a film and can also be easily manufactured into a photosensitive plate, and even into a transparent photosensitive plate depending upon certain kinds of the materials.

In spite of such various advantages, the organic photoconductive materials have not been very much used for the electrophotographic plates for the reason that they were inferior to inorganic materials in their sensitivity and durability.

SUMMARY OF THE INVENTION

As a result of an extensive research on the organic photoconductive materials which present an electrophotographic plate having high sensitivity and high durability, the present inventors have found that certain azo compounds are suitable, and the present invention has been accomplished.

Namely, the present invention resides in an electrophotographic plate comprising an electroconductive substrate and a photosensitive layer coated thereon, wherein said photosensitive layer comprises an azo compound represented by the general formula (I)

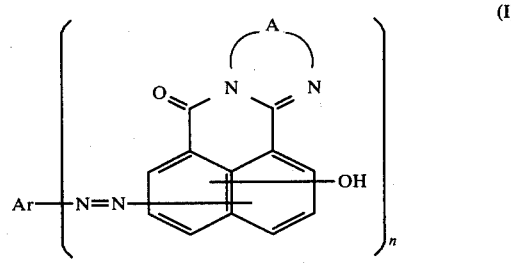

(I)

where A is a divalent group of an aromatic hydrocarbon or a divalent group of a heterocyclic ring containing at least one nitrogen atom in the ring, Ar is an aromatic hydrocarbon group or a heterocyclic group which may be bonded through a connecting group, and n is an integer of 1, 2 or 3.

DETAILED DESCRIPTION OF THE PREFERRED EMBODIMENTS

Now, the present invention will be described in detail. The azo compound contained in the photosensitive layer of the electrophotographic plate of the present invention is the one represented by the above general formula (I).

In the general formula (I), A represents a divalent group of an aromatic hydrocarbon or a divalent group of a heterocyclic ring containing a nitrogen atom in the ring. As the divalent group of the aromatic hydrocarbons, there may be mentioned, for instance, a divalent group of a monocyclic aromatic hydrocarbon such as an o-phenylene group, or a divalent group of a condensed polycyclic aromatic hydrocarbon such as an o-naphthylene, peri-naphthylene, 1,2-anthraquinonylene or 9,10-phenanthrylene group.

As the divalent group of the heterocyclic ring containing a nitrogen atom in the ring, there may be mentioned, for instance, a divalent group of a heterocyclic ring having a 5- to 10-member ring and containing nitrogen atoms, preferably not more than two nitrogen atoms, such as 3,4-pyrazolediyl, 2,3-pyridinediyl, 4,5-pyrimidinediyl, 6,7-indazolediyl, 5,6-benzimidazolediyl or 6,7-quinolinediyl. Taking into account the sensitivity and the durability, o-phenylene, o-naphthylene, peri-naphthylene, 2,3-pyridinediyl and 4,5-pyrimidinediyl are preferred. Especially preferred are o-phenylene and o-naphthylene.

In the present invention, the divalent group of the aromatic hydrocarbon and the divalent group of the heterocyclic ring containing a nitrogen atom in the ring, may optionally have one or more substituents. As such a substituent, there may be mentioned, for instance, alkyl such as methyl, ethyl, n-propyl, i-propyl, n-butyl, i-butyl or n-hexyl; alkoxy such as methoxy, ethoxy, propoxy, or butoxy; hydroxyl; nitro; cyano; halo such as fluoro, chloro, bromo or iodo; carboxyl; alkoxycarbonyl such as ethoxycarbonyl; carbamoyl; aryloxy such as phenoxy; aralkoxy such as benzyloxy; or aryloxycarbonyl such as phenyloxycarbonyl. Among them, alkyl, alkoxy, nitro, halo, hydroxyl and carboxyl are preferred. Especially preferred, are methyl, methoxy, nitro, chloro and hydroxyl.

In the general formula (I), Ar represents an aromatic hydrocarbon group or a heterocyclic group which may be bonded via a mono- to tri-valent connecting group.

As the aromatic hydrocarbon group, there may be mentioned, for instance, a monovalent group of a monocyclic or condensed polycyclic aromatic hydrocarbon such as phenyl, naphthyl, 1-pyrenyl, 2-anthryl, or 5-acenaphthenyl; a divalent group of a monocyclic or condensed polycyclic aromatic hydrocarbon such as phenylene, 1,3- or 1,4-naphthylene, 2,6-anthraquinonylene, 2,7-fluorenylene or pyrenylene; or a divalent group such as biphenylene. As the aromatic hydrocarbon group which may be bonded via a connecting group, there may be mentioned, a divalent group such as a bisphenylene group represented by the general formula

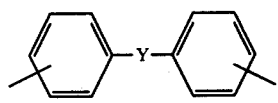

where Y is —O—, —S—, —S—S—, —SO—, —SO₂—, —CO—, —CONH—, —CH₂—, —CH=CH—,

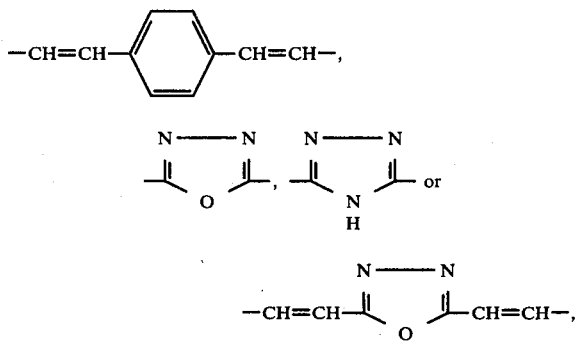

or a trivalent group derived from triphenylamine, triphenylmethane or 9-phenylfluorene.

As the heterocyclic group, there may be mentioned a monovalent group of a heterocyclic ring of a 9- to 20-member ring such as naphthoylenebenzimidazolyl, benzimidazolyl, benzoxazolyl, carbazolyl, benzothiazolyl or quinolyl; a divalent group of a heterocyclic ring of a 9- to 20-member ring such as a carbazolediyl, benzothiophenediyl, dibenzothiophenediyl or benzothiopheneoxidediyl; or a trivalent group such as N-phenylcarbazoletriyl. Taking the sensitivity and durability into accounts, phenyl, naphthyl, pyrenyl, naphthylene, anthraquinonylene, biphenylene, bisphenylene represented by the general formula

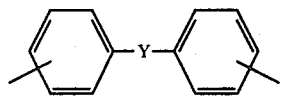

where Y is —O—, —S—, —CH$_2$—, —CH=CH—,

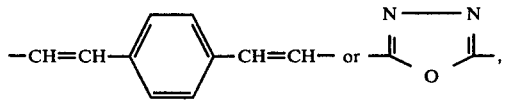

and naphthoylenebenzimidazolyl, are preferred.

Particularly preferred is

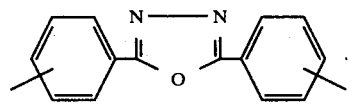

In the present invention, these aromatic hydrocarbon groups and heterocyclic groups may optionally have one or more substituents. Specifically, there may be mentioned, nitro; cyano; halo such as chloro or bromo; alkyl such as methyl, ethyl, n-propyl, or i-butyl; alkoxy such as methoxy, ethoxy, or propoxy; aryl such as phenyl; arylamino such as phenylamino; aryloxy such as phenoxy; or arylvinyl such as styryl or naphthylvinyl. Among them, nitro, cyano, methyl, methoxy and chloro are preferred. Particularly preferred are nitro and cyano.

The azo compounds of the present invention can be readily prepared by a coupling reaction of a coupler component represented by the following general formulas (II-a) and/or (II-b) with a diazonium salt of an aromatic mono-, di- or tri-amine represented by the general formula Ar-NH$_2$)$_n$ where Ar and n are as defined above.

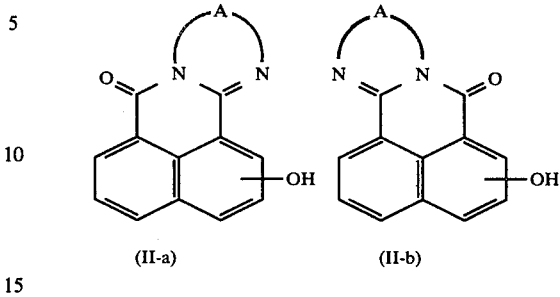

where A is as defined above.

The coupling reaction may be carried out in accordance with the known method, usually at a reaction temperature of not higher than 30° C. for from 1 to 10 hours in water and/or an organic solvent such as dimethylsulfoxide.

The coupler components represented by the general formulas (II-a) and (II-b) may be obtained, for instance, in accordance with the following reaction formula (I), by heating an anhydride of hydroxynaphthalic acid (III) and an aromatic diamine (IV) in a solvent such as acetic acid, to carry out dehydration condensation. (See J. Chem. Soc. 1937, 1764).

Reaction formula (I):

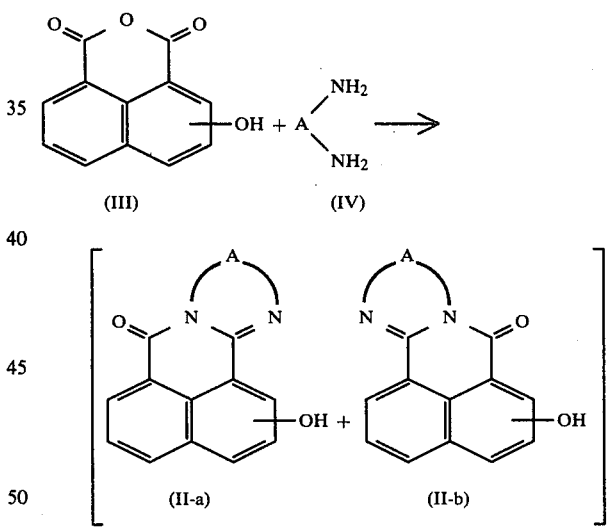

The coupler components obtained by the above synthesis are obtainable as a mixture of their isomers. However, in the present invention, any isomer may be used.

As specific examples of the anhydride of hydroxynaphthalic acid represented by the above formula (III), there may be mentioned, 2-hydroxynaphthalic acid anhydride, 3-hydroxynaphthalic acid anhydride and 4-hydroxynaphthalic acid anhydride. Further, as the aromatic diamine represented by the above formula (IV), there may be mentioned an o- or peri-primary diamine, for example, an o-phenylenediamine such as o-phenylenediamine, 4-nitro-o-phenylenediamine, 4-methyl-o-phenylenediamine, 4-ethyl-o-phenylenediamine, 4-i-propyl-o-phenylenediamine, 4,5-dimethyl-o-phenylenediamine, 4-methoxy-o-phenylenediamine, 4,5-diethoxy-o-phenylenediamine, 4-nitro-o- phenylenediamine, 3,5-dinitro-o-phenylenediamine, 4-chloro-o-phenylenediamine, 4-bromo-o-phenylenediamine, 4-iodo-o-phenylenediamine, 4-chloro-o-phenylenediamine, 4-carboxy-o-phenylenediamine or 4-methoxycarbonyl-o-phenylenediamine; a diamine of a condensed polycyclic aromatic hydrocarbon such as 1,2-naphthylenediamine, 2,3-naphthylenediamine, 1,8-naphthylenediamine, 1,2-diaminoanthraquinone, or 9,10-diaminophenanthrene; a diamine of a heteromonocyclic compound such as 2,3-diaminopyridine, 3,4-diaminopyridine, 4,5-diaminopyrimidine or 3,4-diaminopyrazole; a diamine of a condensed heterocyclic compound such as 5,6-diaminoindazole, 6,7-diaminoindazole, 5,6-diaminobenzimidazole or 5,6-diaminoquinoline; and substitution derivatives thereof.

As other methods for obtaining the coupler components of the present invention, there may be mentioned a method in which instead of the hydroxynaphthalic acid anhydride (III) in the above reaction formula (I), a hydroxynaphthalic acid or its ester is used, a method in which instead of the aromatic diamine, a monoamino-mononitro compound is used and the condensation is reductively carried out, or a method in which an aromatic diamine is condensed with a sulfonated naphthalic acid anhydride and thereafter the sulfonic acid group is hydrolyzed.

Thus, the azo compounds of the present invention can be obtained. Among them, the azo compounds represented by the following general formula (V) are particularly preferred which are obtained by the coupling reaction of 2-hydroxy- and 5-hydroxy-7H-benzimidazo(2,1-a)benz(de)isoquinoline-7-one obtainable by the dehydration condensation reaction of 3-hydroxynaphthalic acid anhydride and substituted or unsubstituted o-phenylene diamine, or its substitution product with a tetrazonium salt of 2,5-bis(4'-aminophenyl)-1,3,4-oxadiazole.

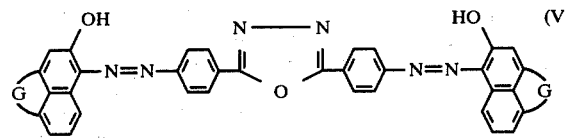
(V)

where G is

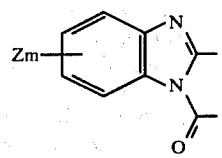

in which Z is a substituent such as methyl, methoxy, nitro, hydroxyl or chloro, and m is an integer of from 0 to 4.

The electrophotographic plate of the present invention has a photosensitive layer comprising one or more of the azo compounds represented by the above general formula (I). Various types of the photosensitive layers are known, and the photosensitive layer of the electrophotographic plate of the present invention may be any one of them. Normally, the photosensitive layer is one of the following types.

(1) a photosensitive layer composed of an azo compound, (2) a photosensitive layer comprising an azo compound dispersed in a binder.

(3) a photosensitive layer comprising an azo compound dispersed in a well known charge transporting medium.

(4) a photosensitive layer comprising one of the photosensitive layers of the above (1) to (3) as the charge generating layer and a charge transporting layer containing a well known charge transporting medium, laminated thereon.

Upon absorption of light, the azo compounds represented by the above general formula (I) generate charge carriers in quite high efficiency. The generated carriers may be transported through the azo compound as the medium. However, it is preferred to have it transported through a well known charge transporting medium as the medium. From this point of view, the photosensitive layers of the types (3) and (4) are particularly preferred.

The charge transporting mediums are generally classified into two kinds, i.e. electron transporting mediums and hole transporting mediums. Both kinds may be used for the photosensitive layer of the photosensitive plate of the present invention, and further a mixture thereof may also be used. As the electron transporting mediums, there may be mentioned electron-attracting compounds having electron-attracting groups such as nitro, cyano or an ester group, for instance, nitrated fluorenones such as 2,4,7-trinitrofluorenone, and 2,4,5,7-tetranitrofluorenone, or tetracyanoquinodimethane. As the hole transporting mediums, there may be mentioned electron-donating organic photoconductive compounds, for example, heterocyclic compounds such as carbazole, indole, imidazole, oxazole, thiazole, oxadiazole, pyrazole, pyrazoline, or thiadiazole, aniline derivatives, hydrazine derivatives, hydrazones or polymers (such as polyvinylcarbazole, or polyglycidylcarbazole) having, on their main chain or side chains, groups derived from the above mentioned compounds. Among them, pyrazoline compounds represented by the following general formula (VI)

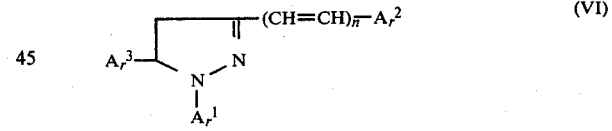
(VI)

where $A_r^1$, $A_r^2$ and $A_r^3$ are independently substituted or unsubstituted aromatic hydrocarbon groups, for instance, phenyl or naphthyl, or substituted or unsubstituted aromatic heterocyclic rings, and n is 0 or 1, or hydrazone compounds represented by the following general formula (VII)

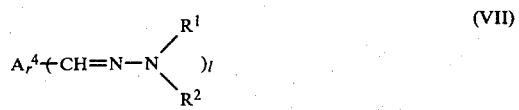
(VII)

where $A_r^4$ is a substituted or unsubstituted aromatic hydrocarbon group such as phenyl, naphthyl or anthryl, or a substituted or unsubstituted aromatic heterocyclic group such as carbazolyl, $R^1$ and $R^2$ are independently alkyl groups such as methyl or ethyl, an aryl group such as phenyl, or an aralkyl group such as benzyl, and l is 1 or 2, are particularly preferred.

The electrophotographic plate of the present invention may be prepared in accordance with the conventional method. For instance, an electrophotographic plate having a photosensitive layer of the above mentioned type (1), may be prepared by coating, on an electroconductive substrate, a coating liquid prepared by dissolving or dispersing an azo compound represented by the above general formula (I) in a suitable medium, and drying it to form a photosensitive layer which usually have a thickness of from several μm to several tens μm. As the medium for the preparation of the coating liquid, there may be mentioned a basic medium capable of dissolving a bisazo compound, such as butyl amine, or ethylenediamine, or a medium capable of dispersing an azo compound, for instance, ethers such as tetrahydrofuran, 1,4-dioxane, etc.; ketones such as methylethyl ketone, cyclohexanone, etc.; aromatic hydrocarbons such as toluene, xylene, etc.; aprotic polar solvents such as N,N-dimethylformamide, acetonitrile, N-methylpyrrolidone, dimethylsulfoxide, etc.; alcohols such as methanol, ethanol, isopropanol, etc.; esters such as ethyl acetate, methyl oxalate, methylcellosolve acetate etc.; or chlorinated hydrocarbons such as dichloroethane, chloroform etc. In the case where the medium capable of dispersing the azo compound is used, it is necessary to pulverize the azo compound into fine particles having a particle size of at most 5 μm, preferably at most 3 μm, most preferably at most 1 μm. Further, as the electroconductive substrate on which the photosensitive layer is to be formed, any one of those commonly used for known electrophotographic plates may be used. Specifically, there may be mentioned, for instance, a drum or sheet of a metal such as aluminum or copper, or a laminate of such metal foils, or a material on which such metals are vapour deposited. Further, there may be mentioned a plastic film, a plastic drum or paper treated to have electroconductivity, by coating an electroconductive substance such as metal powder, carbon black, copper iodide, or high-molecular electrolytes, together with a suitable binder. Furthermore, there may be mentioned a plastic drum or sheet containing an electroconductive substance such as metal powder, carbon black or carbon fibers and thus having electroconductivity. By dissolving a binder in a coating liquid used to form a photosensitive layer of the type (1), it is possible to prepare an electrophotographic plate having a photosensitive layer of the type (2). In this case, the medium of the coating liquid is preferably the one capable of dissolving the binder. As the binder, there may be mentioned various polymers, for instance, a polymer or copolymer of a vinyl compound such as styrene, vinyl acetate, an acrylic ester, or a methacrylic ester, a phenoxy resin, polysulfone, polycarbonate, polyester, cellulose ester, cellulose ether, an urethane resin, or an epoxy resin. The binder is usually used in an amount of from 0.1 to 5 times the weight of the azo compound. To form a photosensitive layer of this type, it is desirable to have the bisazo compound present in the binder in a fine particle form having a particle size of e.g. at most 3 μm, preferably at most 1 μm.

Likewise, by dissolving a charge transporting medium in a coating liquid used to form a photosensitive layer of the above mentioned type (1), it is possible to prepare an electrophotographic plate having a photosensitive layer of the type (3). As the charge transporting medium, any one of those mentioned above can be used. When a charge transporting medium other than those which can be used per se as a binder, such as polyvinylcarbazole or polyglycidylcarbazole, is used, it is preferable to use a binder. As such a binder, any one of those mentioned above may be used. In this case, the amount of the binder used, is usually within a range of from 5 to 1,000 times the weight of the azo compound, and the amount of the charge transporting medium is usually within a range of from 0.2 to 1.5 times, preferably from 0.3 to 1.2 times the weight of the binder. In the case of a charge transporting medium which per se serves as a binder, it is used usually in an amount of from 5 to 100 times the weight of the azo compound. In the case of a photosensitive layer of this type, it is preferred to have the bisazo compound present in the charge transporting medium and binder in a fine particle form, as is the case of the photosensitive layer of the type (3).

By coating on a photosensitive layer of the type (1), (2) or (3), a coating liquid obtained by dissolving a charge transporting medium in a proper medium, and drying it to form a charge transporting layer, it is possible to prepare an electrophotographic plate having a photosensitive layer of the type (4). In this case, the photosensitive layer of the type (1), (2) or (3) serves as a charge generating layer. The charge transporting layer may not necessarily be provided on the charge generating layer, and it may be provided between the charge generating layer and the electroconductive substrate. However, from the point of view of durability, the former is preferable. The formation of the charge transporting layer may be made in a manner similar to the formation of the photosensitive layer of the type (3). Namely, the coating liquid to be used may be the one similar to the coating liquid used to form the photosensitive layer of the type (3) without the azo compound. The charge generating layer usually has a thickness of from 0.01 to 2 μm, and the charge transporting layer usually has a thickness of from 5 to 50 μm.

Of course, the photosensitive layer of the electrophotographic plate of the present invention may contain known sensitizers. As suitable sensitizers, there may be mentioned Lewis acids capable of forming together with an organic photoconductive substance a charge transfer complex, and dyestuffs. As the Lewis acids, there may be mentioned electron-attracting compounds, for instance, quinones such as chloranil, 2,3-dichloro-1,4-naphthoquinone, 2-methylanthraquinone, 1-nitroanthraquinone, 1-chloro-5-nitroanthraquinone, 2-chloroanthraquinone, phenanthrenequinone, etc.; aldehydes such as 4-nitrobenzaldehyde, etc.; ketones such as 9-benzoylanthracene, indanedione, 3,5-dinitrobenzophenone, 3,3',5,5'-tetranitrobenzophenone, etc.; acid anhydrides such as phthalic anhydride, 4-chloronaphthalic anhydride, etc.; cyano compounds such as tetracyanoethylene, terephthalalmalononitrile, 4-nitrobenzalmalononitrile, etc.; phthalides such as 3-benzalphthalide, 3-(α-cyano-p-nitrobenzal)phthalide, 3-(α-cyano-p-nitrobenzal)-4,5,6,7-tetrachlorophthalide etc. As the dyestuffs, there may be mentioned, for instance, triphenylmethane dyes such as Methyl Violet, Brilliant Green, Crystal Violet; thiazine dyes such as Methylene Blue, etc.; quinone dyes such as Quinizaline, etc.; and cyanine dyes, as well as pyrylium salts, thiapyrylium salts, and benzopyrylium salts. They may contain inorganic photoconductive fine particles such as selenium or a selenium-arsenic alloy; or organic photoconductive pigments such as copper phthalocyanine pigment or perynone pigment.

Further, the photosensitive layer of the electrophotographic plate of the present invention may contain known plasticizers to improve the film-forming property, flexibility and mechanical strength. As the plasticizers, there may be mentioned organic compounds such as phthalic ester, phosphoric ester, epoxy compounds, chlorinated paraffin, chlorinated fatty acid ester, methylnaphthalene, etc. Furthermore, it may of course be provided with an adhesive layer, an intermediate layer or a transparent insulating layer, as the case requires.

The photosensitive plate of the present invention has high sensitivity. Its colour sensitivity is also good. When used repeatedly, there is little change in the sensitivity or the charging property, and its light-fatigue is minimal and the durability is extremely good.

Further, the photosensitive plate of the present invention may be widely used in the application fields of the electrophotography such as photosensitive materials for printers employing lasers or cathode-ray tubes (CRT) as the light source, as well as electrophotographic copying machines.

Having generally described the invention, a further understanding can be obtained by reference to certain specific examples which are provided herein for purpose of illustration only and are not intended to be limiting unless otherwise specified.

In the following Reference Examples and Examples, the "part(s)" means "part(s) by weight".

REFERENCE EXAMPLE 1

13.8 parts of 3-hydroxynaphthalic anhydride (manufactured by Tokyo Kasei Kogyo Co.) and 9.2 parts of o-phenylenediamine were dissolved and stirred in a solvent mixture composed of 30 parts of acetic acid and 150 parts of nitrobenzene, and they were reacted for 2 hours at the boiling point of the acetic acid. The reaction mixture was cooled to room temperature upon completion of the reaction, and the crystals thereby precipitated were collected by filtration, thoroughly washed with methanol and then dried. The crystals thereby obtained were yellow and feather-like and did not melt at a temperature below 320° C. From the elemental analysis and the infrared spectrum measurement, the crystals were found to be 2-hydroxy- and 5-hydroxy-7H-benzimidazo(2,1-a)benz(de)isoquinoline-7-one. The yield was 17.8 parts and the elemental analysis gave the following values.

As $C_{18}H_{10}O_2N_2$, Calculated values: C 75.54%, H 3.53% and N 9.78%. Measured values: C 75.50%, H 3.49% and N 9.72%.

3.1 parts of the above mentioned 2-hydroxy- or 5-hydroxy-7H-benzimidazo(2,1-a)benzo(de)isoquinoline-7-one and 2.0 parts of sodium hydroxide powder were mixed with 500 parts of dimethylsulfoxide, and while stirring them at a temperature of 20° C., a dimethylsulfoxide solution of tetrazonium tetrafluoroborate of 2,5-bis(4'-aminophenyl)-1,3,4-oxadiazole was dropwise added thereto, and the reaction mixture was maintained for 3 hours. After the reaction, 20 parts of acetic acid was added to the reaction solution, and the bisazo compound thereby precipitated was collected by filtration, then washed with diluted acetic acid, water, methanol and tetrahydrofuran, and dried. The solid thereby obtained was dark violet and did not melt at a temperature below 320° C. From the elemental analysis and the infrared spectrum measurement, this product was found to be the desired bisazo compound (i.e. the compound of the above general formula (V) where m=0). The yield was 2.5 parts and the elemental analysis gave the following values.

As $C_{50}H_{26}O_5N_{10}$, Calculated values: C 70.92%, H 3.09% and N 16.53%. Measured values: C 69.91%, H 3.10% and N 16.02%.

The azo compounds of the present invention used in the following Examples were prepared in accordance with this Reference Example or a method similar thereto.

EXAMPLES 1 TO 10

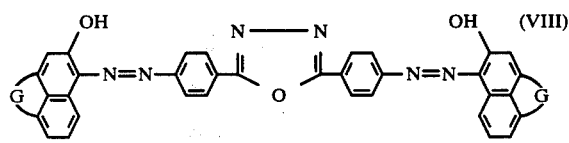

0.45 part of a bisazo compound having a structure corresponding to the above general formula (VIII) where G is as listed in Table 1, was dispersed together with 30 parts of cyclohexanone by a sand grinder, and 0.9 part of polyester (Trademark: Vylon 200 manufactured by Toyobo Co., Ltd.) was added thereto and dissolved. The dispersion of the bisazo compound thereby obtained was coated on a vapour-deposited aluminum layer formed on a polyester film having a thickness of 100 μm, by a film applicator so as to form a film having a thickness of 0.6 g/m² after drying, and then dried. On the charge generating layer thus obtained, a solution prepared by dissolving 80 parts of N-ethylcarbazole-3-aldehydediphenylhydrazone, 0.2 part of 3-(α-cyano-p-nitrobenzal)-4,5,6,7-tetrachlorophthalide and 100 parts of a methacrylic resin (Trademark: Dianal BR-85 manufactured by Mitsubishi Rayon Co.) in 550 parts of toluene, was applied so as to form a film having a thickness of 10 μm after drying, whereupon a charge transporting layer was formed. Thus, electrophotographic plates having a photosensitive layer composed of two layers was obtained.

As the sensitivity of these photosensitive plates, the half-decay exposure intensities ($E_{\frac{1}{2}}$) are shown in Table 1.

The half-decay exposure intensities were measured by subjecting the photosensitive plates to an electrostatic paper analyser (Model SP-428 manufactured by Kawaguchi Denki Seisakusho). The half-decay exposure intensity was determined by first charging the plate by −6.5 KV corona discharge in a dark place, then exposing it to incandescent light having illumination of 5 lux, and measuring the exposure intensity required till the surface potential decayed to one half of the initial surface potential.

TABLE 1

| Examples | G | $E_{\frac{1}{2}}$ (lux · sec) |
|---|---|---|
| 1 | ![benzoxazole structure] | 2.3 |

TABLE 1-continued

| Examples | G | $E_{\frac{1}{2}}$ (lux · sec) |
|---|---|---|
| 2 | 5,6-dimethyl-benzimidazole-1-carbonyl | 2.8 |
| 3 | 5-nitro-benzimidazole-1-carbonyl and 6-nitro-benzimidazole-1-carbonyl | 4.7 |
| 4 | 5-chloro-benzimidazole-1-carbonyl and 6-chloro-benzimidazole-1-carbonyl | 2.7 |
| 5 | 5-methoxy-benzimidazole-1-carbonyl and 6-methoxy-benzimidazole-1-carbonyl | 5.4 |
| 6 | 5-carboxy-benzimidazole-1-carbonyl and 6-carboxy-benzimidazole-1-carbonyl | 3.6 |
| 7 | naphtho-imidazole-1-carbonyl | 3.1 |
| 8 | naphtho[1,8]-diazine-carbonyl | 10.5 |
| 9 | imidazo[4,5-b]pyridine-carbonyl (two isomers) | 13 |
| 10 | bis(hydroxymethyleneamino)-imidazole-carbonyl | 35 |

EXAMPLES 11 TO 19

$$L-N=N-D-N=N-L \qquad (IX)$$

The sensitivity was measured under the same conditions as in Example 1 except that instead of the bisazo compounds of Example 1, bisazo compounds represented by the general formula (IX) where L and D are as shown in Table 2, were used. The results thereby obtained are shown in Table 2.

TABLE 2
| Examples | Bisazo Compounds L | Bisazo Compounds D | $E_{\frac{1}{2}}$ (lux · sec) |
|---|---|---|---|
| 11 | 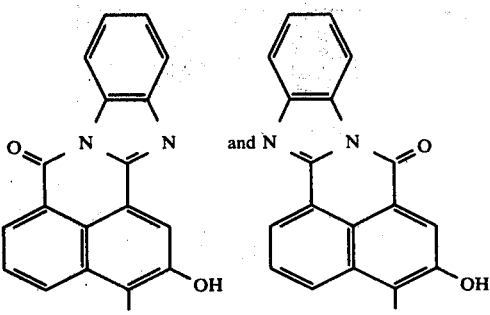 | 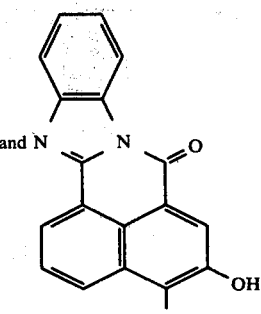 | 4.8 |
| 12 | 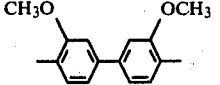 | 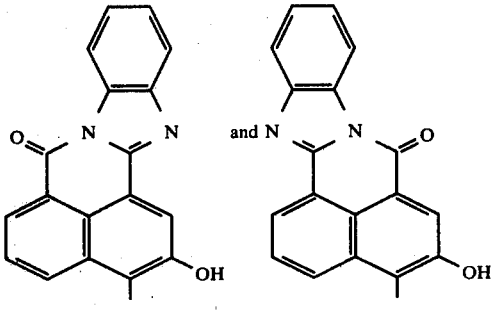 | 11.6 |
| 13 | 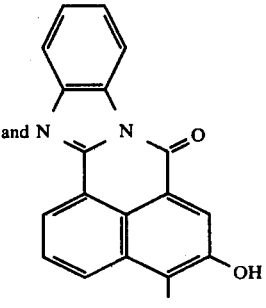 |  | 15.1 |
| 14 | 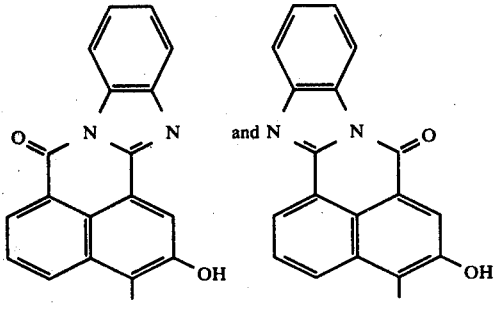 | 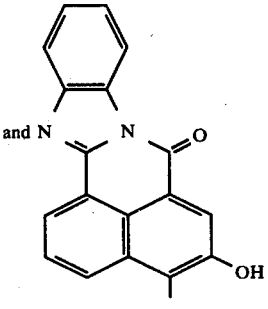 | 4.4 |
| 15 | 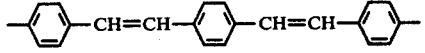 | 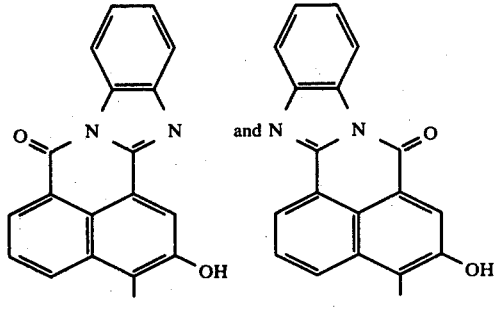 | 5.8 |

TABLE 2-continued
| Examples | Bisazo Compounds L | D | $E_{\frac{1}{2}}$ (lux · sec) |
|---|---|---|---|
| 16 | 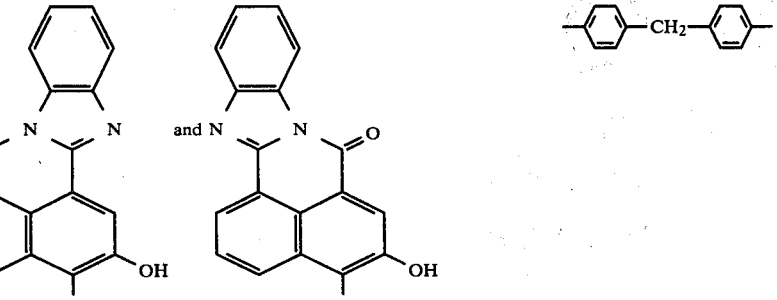 | 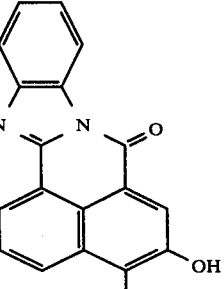 | 12.6 |
| 17 | 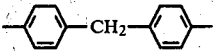 | 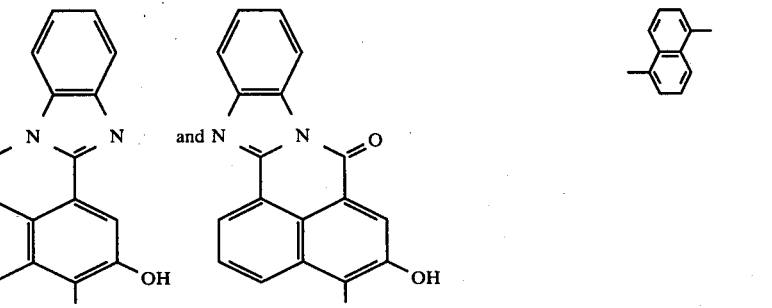 | 14.8 |
| 18 | 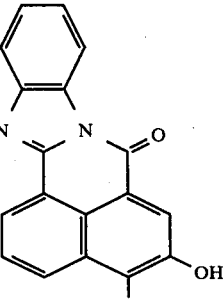 |  | 4.4 |
| 19 | 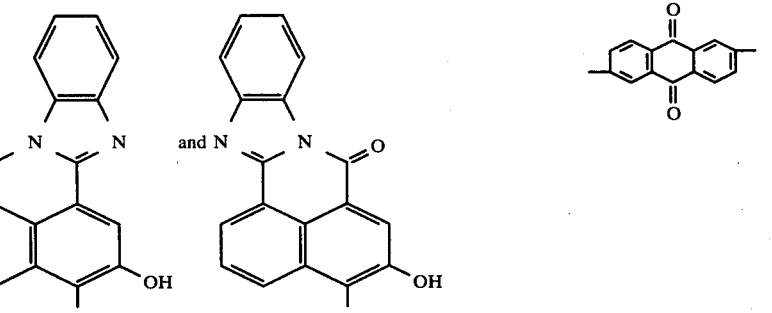 | 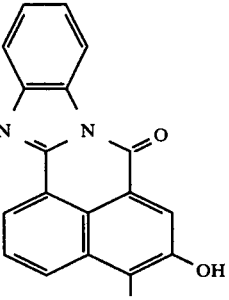 | 11.6 |
EXAMPLES 20 TO 26
M—N=N—L  (X)
The sensitivity was measured under the same conditions as in Example 1 except that instead of the bisazo compounds of Example 1, monoazo compounds represented by the general formula (X) where M and L are as shown in Table 3 were used. The results thereby obtained are shown in Table 3.

| Examples | Monoazo Compounds L | | M | $E_{\frac{1}{2}}$ (lux · sec) |
|---|---|---|---|---|
| 20 | 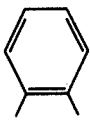 and 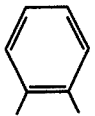 | | 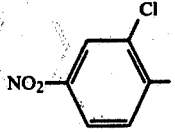 | 11.1 |
| 21 | 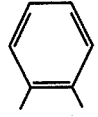 and 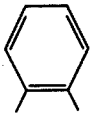 | | 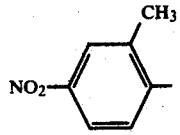 | 12.5 |
| 22 | 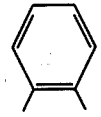 and 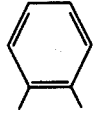 | | 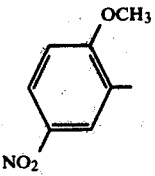 | 22 |
| 23 | 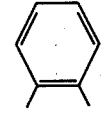 and 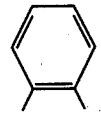 | | 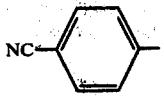 | 5.1 |
| 24 | 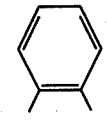 and 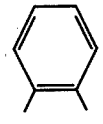 | | 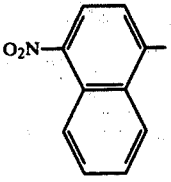 | 10.8 |

| Examples | Monoazo Compounds L | M | $E_{\frac{1}{2}}$ (lux · sec) |
|---|---|---|---|
| 25 | 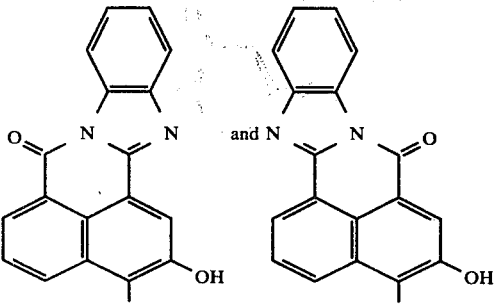 | 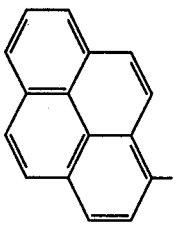 | 26 |
| 26 | 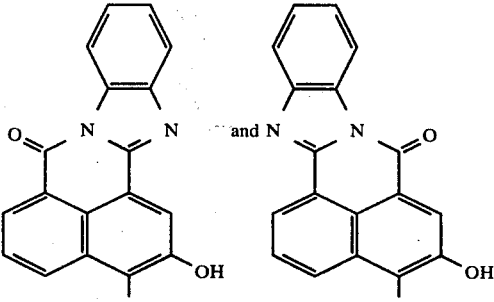 | 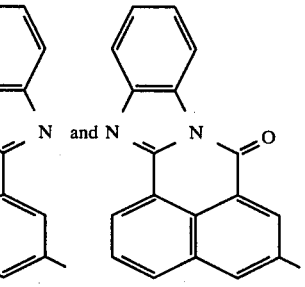 | 7.4 |

EXAMPLE 27

0.45 part of the same bisazo compound as used in Example 1 and 0.9 part of polyester (Trademark: Vylon 200 manufactured by Toyobo Co., Ltd.) were added to 40 parts of cyclohexanone, and dispersed by a sand grinder.

This dispersion was coated on a vapour-deposited aluminum layer formed on a polyester film having a thickness of 100 μm, by a film applicator so as to form a film having a thickness of 0.3 g/m² after drying, and then dried. On the charge generating layer thus obtained, a solution prepared by dissolving 8 parts of N-ethylcarbazole-3-aldehydediphenylhydrazone and 10 parts of polyester (Vylon 200) in 60 parts of tetrahydrofuran, was applied to form a film having a thickness of 13 μm after drying, whereupon a charge transporting layer was formed.

The photosensitive plate having a photosensitive layer composed of two layers thus obtained was subjected to the property measurement by means of the device as used in Example 1.

The change of the sensitivity was investigated by repeating a cycle of firstly subjecting the plate to corona discharge so that the surface potential of the plate became −500 V, and then exposing it to incandescent light having illumination of 400 lux for 2 seconds, whereby it was found that the initial sensitivity was determined in terms of $E_{\frac{1}{2}}=2.8$ lux·sec and $E_{1/5}=5.7$ lux·sec by incandescent light having illumination of 5 lux (where $E_{\frac{1}{2}}$ is as defined above, and $E_{1/5}$ is an exposure intensity required to reduce the surface potential to one fifth), and the sensitivity after repeating the cycle 2,000 times was determined in terms of $E_{\frac{1}{2}}=2.7$ lux·sec and $E_{1/5}=5.6$ lux·sec.

Further, this photosensitive plate was set in a copy machine (SF-740 manufactured by Sharp Corporation), and the charging and exposure were repeated, whereby it was found that the change in the surface potential after the repeated copying operation of 2,000 times was 4% as compared with the surface potential at the initial stage.

As shown by the above result, the variation in the electric properties of the photosensitive plate resulting from the repeated operation was extremely small.

Further, a test chart (manufactured by Data Quest Co.) was copied, whereupon a sharp image without fogging was obtained, and with respect to colour reproduction, various colours except for yellow were clearly reproduced.

EXAMPLE 28

0.3 part of the same monoazo compound as used in Example 20 was pulverized and added to 20 parts of cyclohexanone, and the mixture was dispersed by means of a supersonic dispersing device. 30 parts of tetrahydrofuran, 10 parts of polyester (Trademark: Vylon 200 manufactured by Toyobo Co., Ltd.) and 10 parts of 1,3-diphenyl-5-(p-dimethylaminophenyl)-2-pyrazoline were added thereto and dissolved. This coating liquid was coated on a vapour-deposited aluminum layer formed on a polyethylene film and having a thickness of 100 μm, by a film applicator, to form a photosensitive layer having a film thickness of 10 μm after drying. The sensitivity of this photosensitive plate was measured. In the case of the charging with corona discharge of +6 KV, $E_{\frac{1}{2}}$ was 48 lux·sec, and in the case of the charging with corona discharge of −6 KV, $E_{\frac{1}{2}}$ was 50 lux·sec.

EXAMPLE 29

A photosensitive plate was prepared in a manner similar to Example 28 except that instead of the monoazo compound, 0.3 part of the bisazo compound as used in Example 1 and instead of the 1,3-diphenyl-5-(p-dimethylaminophenyl)-2-pyrazoline, 10 parts of 2,4,6-trinitrofluorenone were added. This photosensitive plate was charged by −6 KV corona discharge, and the sensitivity was measured, whereby the sensitivity $E_{\frac{1}{2}}$ was found to be 55 lux·sec.

EXAMPLE 30

A photosensitive plate was prepared in a manner similar to Example 28 except that instead of the 1,3-diphenyl-5-(p-dimethylaminophenyl)-2-pyrazoline of Example 28, 10 parts of polyvinylcarbazole (Trademark: Tuvicol 210 manufactured by Takasago Koryo Co.) was added. In the case of the charging with corona discharge of −6 KV, the sensitivity $E_{\frac{1}{2}}$ was 32 lux·sec.

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. An electrophotographic plate comprising an electroconductive substrate and a photosensitive layer coated thereon, wherein said photosensitive layer comprises an azo compound represented by the general formula (I)

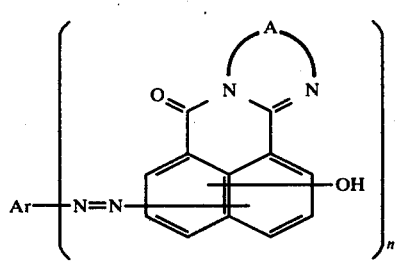

wherein A is a divalent group of an aromatic hydrocarbon or a divalent group of a heterocyclic ring containing at least one nitrogen atom in the ring, Ar is an aromatic hydrocarbon group or a heterocyclic group which may be bonded through a connecting group, and n is an integer of 1, 2 or 3.

2. The electrophotographic plate according to claim 1 wherein A is an o-phenylene, o-naphthylene, peri-naphthylene, 2,3-pyridinediyl or 4,5-pyrimidinediyl group, each of which may optionally have one or more substituents.

3. The electrophotographic plate according to claim 1 wherein A is an o-phenylene or o-naphthylene group, each of which may optionally have one or more substituents.

4. The electrophotographic plate according to claim 2 or 3 wherein the substituent is selected from the group consisting of methyl, methoxy, nitro, chloro and hydroxy.

5. The electrophotographic plate according to claim 1 wherein Ar is a phenyl group, a naphthyl group, a 1-pyrenyl group, a naphthylene group, an anthraquinonylene group, a biphenylene group, a bisphenylene group represented by the general formula:

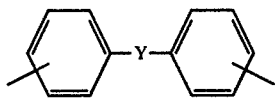

where Y is —O—, —S—, —CH$_2$—, —CH=CH—,

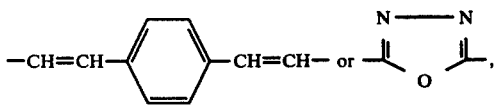

or a naphthoylenebenzimidazolyl group, each of which may optionally have one or more substituents.

6. The electrophotographic plate according to claim 5 wherein the substituent is selected from the group consisting of nitro, cyano, methyl, ethoxy and chloro.

7. The electrophotographic plate according to claim 1 wherein Ar is

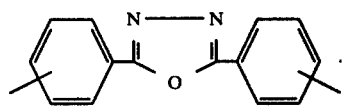

8. The electrophotographic plate according to any one of claims 1 to 7 wherein the photosensitive layer comprises a charge-generating layer containing the azo compound of claim 1 and a charge-transporting layer coated thereon and containing a pyrazoline compound represented by the general formula (VI)

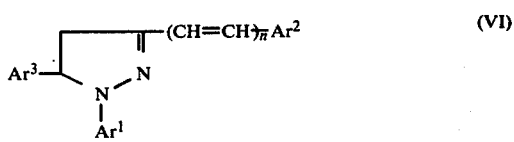

where Ar$^1$, Ar$^2$ and Ar$^3$ are independently substituted or unsubstituted aromatic hydrocarbon groups or aromatic heterocyclic groups, and n is an integer of 0 or 1.

9. The electrophotographic plate according to any one of claims 1 to 7 wherein the photosensitive layer comprises a charge-generating layer containing the azo compound of claim 1 and a charge transporting layer coated thereon and containing a hydrazone compound represented by the general formula (VII)

where Ar$^4$ is a substituted or unsubstituted aromatic hydrocarbon group or aromatic heterocyclic group, R$^1$ and R$^2$ are independently alkyl, aryl or aralkyl, and l is an integer of 1 or 2.

10. The electrophotographic plate according to claim 1 wherein the azo compound is pulverized into fine particles having a particle size of at most 5μ.

* * * * *